US007546089B2

(12) United States Patent
Bellantoni

(10) Patent No.: US 7,546,089 B2
(45) Date of Patent: Jun. 9, 2009

(54) SWITCHABLE DIRECTIONAL COUPLER FOR USE WITH RF DEVICES

(75) Inventor: John Vincent Bellantoni, Redwood City, CA (US)

(73) Assignee: TriQuint Semiconductor, Inc., Hillsboro, OR (US)

( * ) Notice: Subject to any disclaimer, the term of this patent is extended or adjusted under 35 U.S.C. 154(b) by 502 days.

(21) Appl. No.: 11/179,079

(22) Filed: Jul. 11, 2005

(65) Prior Publication Data

US 2007/0008132 A1 Jan. 11, 2007

Related U.S. Application Data

(63) Continuation-in-part of application No. 11/021,302, filed on Dec. 23, 2004, now Pat. No. 7,197,279.

(51) Int. Cl.
*H04B 1/38* (2006.01)

(52) U.S. Cl. ............................ 455/73; 455/78; 455/83; 333/101; 333/104; 333/109

(58) Field of Classification Search .................. 455/73, 455/78, 83; 333/101, 104, 109, 117, 136
See application file for complete search history.

(56) References Cited

U.S. PATENT DOCUMENTS

| | | | | |
|---|---|---|---|---|
| 4,145,692 | A * | 3/1979 | Armstrong et al. | 342/173 |
| 5,241,566 | A | 8/1993 | Jackson | |
| 6,317,608 | B1 | 11/2001 | Glocker | |
| 6,400,963 | B1 | 6/2002 | Glockler et al. | |
| 6,621,376 | B2 | 9/2003 | Liu et al. | |
| 6,636,730 | B2 | 10/2003 | Spargo et al. | |
| 6,657,592 | B2 | 12/2003 | Dening et al. | |
| 6,774,863 | B2 | 8/2004 | Shirosaka et al. | |
| 6,795,714 | B1 | 9/2004 | Fickenscher et al. | |
| 6,834,084 | B2 | 12/2004 | Hietala | |
| 6,961,368 | B2 | 11/2005 | Dent et al. | |
| 6,972,626 | B2 | 12/2005 | Takahashi et al. | |
| 6,983,025 | B2 | 1/2006 | Schell | |
| 6,992,543 | B2 | 1/2006 | Luetzelschwab et al. | |
| 2002/0017981 | A1 | 2/2002 | Turner | |
| 2002/0049044 | A1 | 4/2002 | Indseth | |

(Continued)

OTHER PUBLICATIONS

Garver, J., Excerpts from "Microwave Diode Control Devices", Harry Diamond Laboratories, Artech House, Inc. Standard Book No. 0-89006-022-3, Library of Congress Catalog Card No. 74-82596, (1976) Figs. 7-4-7-9 and Figs. 7-12-7-13, pp. 186-188 and p. 192.

(Continued)

*Primary Examiner*—Tuan A Pham
(74) *Attorney, Agent, or Firm*—Morgan, Lewis & Bockius, LLP.

(57) ABSTRACT

The embodiments of the present invention provide a directional coupler switchable between a normal state and a bypass state. In one embodiment, the directional coupler comprises shunt switches for switching between the normal state and the bypass state, and first and second transmission lines each extending between first and second ends, wherein the shunt switches comprises a first switch coupled to the first end of the first transmission line, a second switch coupled to the first end of the first transmission line, and a third switch coupled between the second end of the first transmission line and the second end of the second transmission line.

12 Claims, 8 Drawing Sheets

U.S. PATENT DOCUMENTS

| | | | | |
|---|---|---|---|---|
| 2002/0055337 | A1 | 5/2002 | Persico et al. | |
| 2002/0060615 | A1 * | 5/2002 | Kodim | 333/101 |
| 2002/0099894 | A1 | 7/2002 | Kehoe et al. | |
| 2002/0176514 | A1 | 11/2002 | Schell | |
| 2003/0071731 | A1 | 4/2003 | Jesme | |
| 2003/0090367 | A1 | 5/2003 | Carroll et al. | |
| 2003/0193997 | A1 * | 10/2003 | Dent et al. | 375/219 |
| 2004/0069852 | A1 | 4/2004 | Seppinen et al. | |
| 2004/0087280 | A1 | 5/2004 | Watanabe et al. | |
| 2004/0092292 | A1 | 5/2004 | Muto et al. | |
| 2004/0160309 | A1 | 8/2004 | Stilp | |
| 2004/0203478 | A1 | 10/2004 | Scott | |
| 2004/0208157 | A1 | 10/2004 | Sander et al. | |
| 2005/0027604 | A1 | 2/2005 | Bandy et al. | |
| 2005/0087599 | A1 | 4/2005 | Ward et al. | |
| 2005/0088237 | A1 | 4/2005 | Gamero et al. | |
| 2005/0135502 | A1 | 6/2005 | Zhang et al. | |
| 2005/0210173 | A1 | 9/2005 | Kehoe et al. | |

OTHER PUBLICATIONS

Hill, Joseph C., et al., "PIN Diode Switches Handle High-Power Applications", Reprinted from Microwave Systems News—Technical Feature, (Jun. 1989) pp. 1-6.

Waugh, Raymond W., "SPDT Switch Serves PCN Applications—Minimal Loss, High Isolation, and Low Cost Were Driving Forces in the Design of this Battery-Powered Transmit/ Receive Switch", Microwaves & RF—Design Feature, (Jan. 1994) pp. 111-118.

White, Joseph F., Excerpts from "Microwave Semiconductor Engineering", Van Nostrand Reinhold Company, (1982) Fig. VIII-49 p. 373.

* cited by examiner

SWITCHABLE DIRECTIONAL COUPLER FOR USE WITH RF DEVICES

CROSS REFERENCE TO RELATED APPLICATIONS

This application is a continuation-in-part of U.S. patent application Ser. No. 11/021,302 filed Dec. 23, 2004 now U.S. Pat. No. 7,197,279, entitled "Multiprotocol RFID Reader." This application is also related to U.S. patent application Ser. No. 11/021,946 filed Dec. 23, 2004 entitled "Linearized Power Amplifier Modulator in an RFID Reader," and related to U.S. patent application Ser. No. 11/021,539 filed Dec. 23, 2004 entitled "Integrated Switching Device for Routing Radio Frequency Signals." These three patent applications are incorporated herein by reference.

FIELD OF THE INVENTION

The present invention relates in general to wireless communications using radio-frequency signals, and particularly to directional couplers in radio-frequency devices.

BACKGROUND OF THE INVENTION

A wireless device that is able to communicate with others using radio frequency (RF) signals is usually equipped with an RF transmitter and receiver. An RF receiver employing a so-called superheterodyne architecture typically includes an antenna that transforms electromagnetic waves in the air into an RF electrical signal, a bandpass filter for separating a useful frequency band from unwanted frequencies in the signal, a low noise amplifier, a first mixer that translates a carrier frequency in the RF electrical signal into a lower and fixed frequency, which is an intermediate frequency (IF) equal to the difference between the carrier frequency and a local oscillator frequency, an IF filter, which is a bandpass filter centered on the IF frequency, and a second mixer that translates the IF signals to baseband so that the frequency spectrum of the resulting signal is centered on zero.

An RF receiver employing a homodyne architecture makes a direct conversion from the RF carrier frequency to the baseband usually with just one mixer, whose local oscillator is set to the same frequency as the carrier frequency in the received RF signal. With the homodyne architecture, there is no need for the IF filter, and only one mixer is required, resulting in lower power consumption and easier implementation of the receiver in an integrated circuit (IC) chip.

Some homodyne radios transceivers, such as interrogators or readers for radio frequency identification (RFID), are designed to receive a backscattered portion of a transmitted signal. RFID technologies are widely used for automatic identification. A basic RFID system includes an RFID tag or transponder carrying identification data and an RFID interrogator or reader that reads and/or writes the identification data. An RFID tag typically includes a microchip for data storage and processing, and a coupling element, such as an antenna coil, for communication. Tags may be classified as active or passive. Active tags have built-in power sources while passive tags are powered by radio waves received from the reader and thus cannot initiate any communications.

An RFID reader operates by writing data into the tags or interrogating tags for their data through a radio-frequency (RF) interface. During interrogation, the reader forms and transmits RF waves, which are used by tags to generate response data according to information stored therein. The reader also detects reflected or backscattered signals from the tags at the same frequency, or, in the case of a chirped interrogation waveform, at a slightly different frequency. With the homodyne architecture, the reader typically detects the reflected or backscattered signal by mixing this signal with a local oscillator signal.

In a conventional homodyne reader, such as the one described in U.S. Pat. No. 2,114,971, two separate decoupled antennas for transmission (TX) and reception (RX) are used, resulting in increased physical size and weight of the reader, and are thus not desirable. To overcome the problem, readers with a single antenna for both TX and RX functions are developed by employing a microwave circulator or directional coupler to separate the reflected signal from the transmitted signal, such as those described in U.S. Pat. No. 2,107,910. In another patent, U.S. Pat. No. 1,850,187, a tapped transmission line serves as both a phase shifter and directional coupler.

Because circulators are usually complex and expensive devices employing non-reciprocal magnetic materials, the use of a directional coupler is often preferred for low-cost radios. Conventional directional couplers, however, introduce losses in the receive chain. These losses may be tolerable for a radio transceiver operating in backscatter mode, where sensitivity is limited by spurious reflections of the transmitted signal from the antenna and nearby objects, but are objectionable when the radio is used as a pure receiver, as may be done for example in a LISTEN mode to detect nearby radios operating in the same band.

SUMMARY OF THE INVENTION

In general, the embodiments of the present invention provide a directional coupler switchable between a normal state and a bypass state. In one embodiment, the directional coupler comprises shunt switches for switching between the normal state and the bypass state, and first and second transmission lines each extending between first and second ends, wherein the shunt switches comprises a first switch coupled to the first end of the first transmission line, a second switch coupled to the first end of the first transmission line, and a third switch coupled between the second end of the first transmission line and the second end of the second transmission line.

The directional coupler further comprises first, second, and third ports, and in the normal state allows a large portion of a first signal received at the first port to pass to the second port and couples a portion of a second signal received at the second port to the third port. The directional coupler in the bypass state provides a direct path for the second signal received at the second port to pass to the third port. In the bypass state, the directional coupler also functions as a quarter-wave transformer that isolates the first signal directed toward the first port from the second signal received at the second port.

In one embodiment, each shunt switch comprises at least one PIN diode or FET that is RF grounded through a blocking capacitor, and each of the transmission lines is terminated at both ends with PIN diodes or FETs. The directional coupler further comprises a drive circuit that facilitates control of the shunt switches by either forward or reverse biasing the PIN diodes or FETs.

The directional coupler can be used in a radio frequency (RF) transceiver comprising an RF transmitter and an RF receiver. The directional coupler is coupled between an antenna and the RF transmitter and between the antenna and the RF receiver. In the normal state, the directional coupler allows passage of a large portion of a transmit signal from the RF transmitter to the antenna and couples a portion of a received RF signal from the antenna to the RF receiver. In the bypass state, the directional coupler provides a direct path for the received RF signal from the antenna to the RF receiver.

A particular application of the directional coupler is with a radio frequency identification (RFID) interrogator. The embodiments of the present invention also provide a method of operating an RFID interrogator having the switchable directional coupler for switching between a normal state and a bypass state. The method comprises setting a logic input to a control terminal of the directional coupler to a first level to allow the directional coupler to operate in the bypass state and the RFID interrogate to operate in a LISTEN mode, and setting the logic input to a second level to allow the directional coupler to operate in the normal state and the RFID interrogator to transmit RF signals for interrogating at least one RFID tag. In one embodiment, the directional coupler comprises shunt switches each having at least one PIN diode, and setting the logic input to the first level causes the PIN diodes to be forward biased while setting the logic input to the second level causes the PIN diodes to be reverse biased.

Therefore, there is a need for a mechanism to effectively remove the directional coupler and its associated losses from the receive chain of a radio transceiver when desired, using minimal additional components and imposing minimal additional losses on the received and/or transmitted signal.

DETAILED DESCRIPTION OF THE INVENTION

Figure 1A:
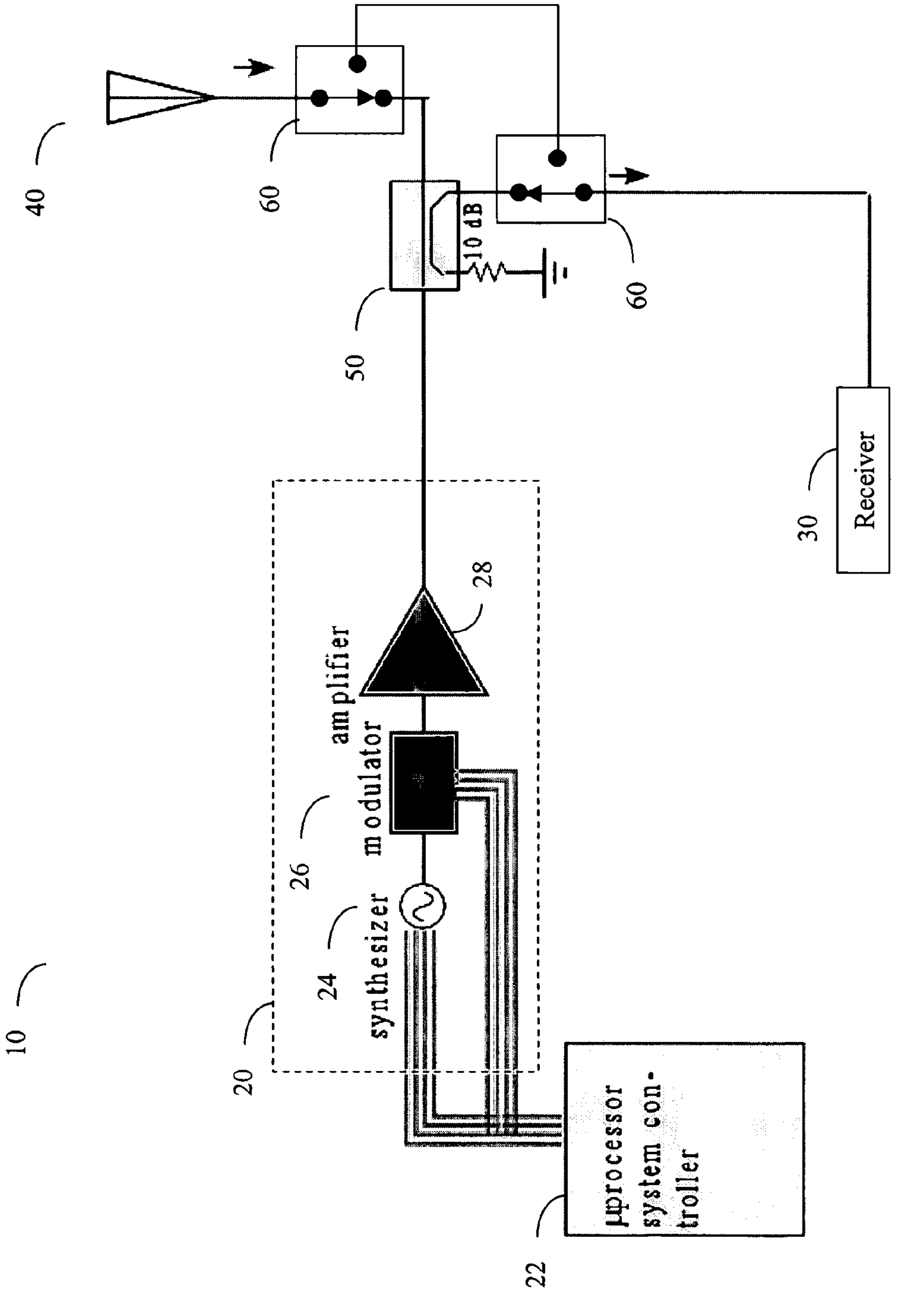
FIG. 1A is a schematic diagram of an RF radio employing a conventional directional coupler and a pair of switches for directing a received signal around the directional coupler when the radio is used as a receiver.

FIG. 1A shows an RF radio 10 having an RF transmitter 20 and an RF receiver 30 connected to an antenna 40 via a directional coupler 50. The transmitter 20 is shown to comprise a microprocessor system controller 22, a frequency synthesizer 24, an optional modulator 26, and an amplifier 28. A pair of RF switches 60 may be used to direct a received signal around the directional coupler when the radio 10 is used as a receiver. The switches 60 are usually relatively complex double-throw switches, such as conventional Single Pole and Double Throw (SPDT) switches. An SPDT switch can be on in both positions, and is sometimes called a changeover switch. In the example shown in FIG. 1A, the switches 60 are used to couple the receiver 30 to the antenna 40 via the directional coupler 50 in one position and to allow a received signal to bypass the directional coupler 50 in the other position. By bypassing the directional coupler 50, the received signal does not suffer an exemplary 10 dB loss normally incurred by the directional coupler 50. The switches 60, however, would incur an additional loss (as much as 0.5 dB) in both the received and transmitted signal when the radio 10 is in normal operation. When the radio 10 is used as a receiver, the received signal would see insertion losses from both of the switches 60.

Figure 1B:
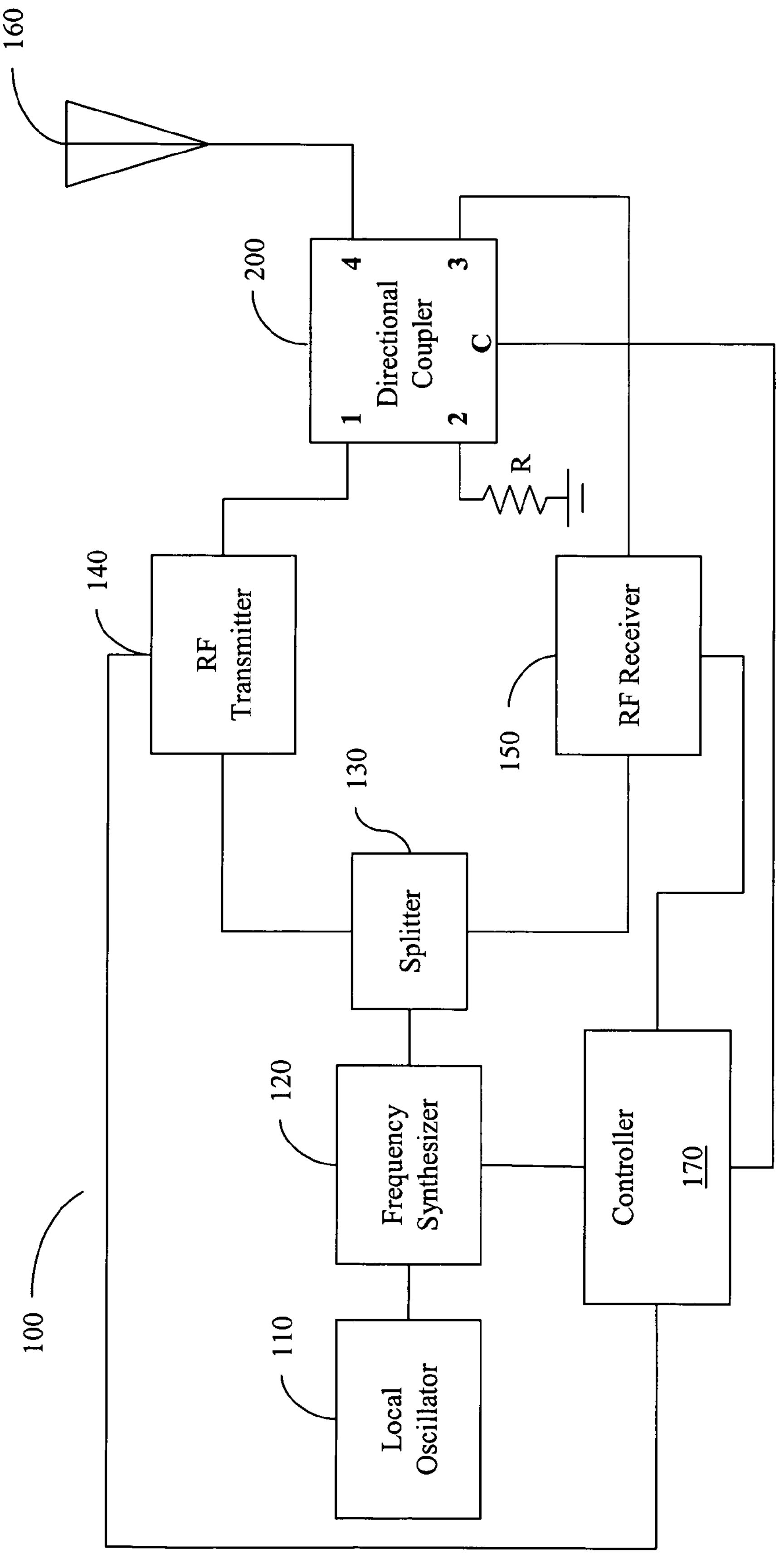
FIG. 1B is block diagram of an RF transceiver employing a switchable directional coupler according to one embodiment of the present invention.

FIG. 1B is a block diagram of an RF transceiver 100 employing a switchable directional coupler 200 according to one embodiment of the present invention. As shown in FIG. 1B, RF transceiver 100 includes a local oscillator 110 configured to generate a clock signal, a frequency synthesizer 120 configured to generate a continuous wave (CW) signal referencing the clock signal, and a splitter 130 configured to split the CW signal into a first portion and a second portion. RF transceiver 100 further includes an RF transmitter 140 configured to modulate and amplify the first portion of the CW signal to form a transmit signal, and an RF receiver 150 configured to mixed a received RF signal with the second portion of the CW signal to generate one or more baseband signals from the received RF signal.

In one embodiment, RF transceiver 100 uses a same antenna or same set of antennas 160 for transmitting the transmit signal and for receiving the received RF signal. RF transceiver 100 further includes a switchable directional coupler 200, which is switchable between at least two states, a normal state and a bypass state. Directional coupler 200 has a plurality of I/O ports, including port 1 that is coupled to RF transmitter 140, port 2 that is terminated to ground through a termination resistor R, port 3 that is coupled to RF receiver 150, port 4 that is coupled to antenna(s) 160, and a control port, port C, for receiving a control signal to switch the state of the directional coupler from the normal state to the bypass state, or vise versa.

In the normal state, directional coupler functions like a conventional directional coupler with port 1 being an input port, port 4 being a transmitted port, port 3 being a coupled port, and port 2 being an isolated port. Thus, directional coupler 200 in the normal state allows a large portion, such as 70% to 95%, of the transmit signal received at port 1 from RF transmitter 140 to pass via port 2 to antenna 160, and extracts a portion of the received RF signal sent from antenna 160 to port 4, which extracted portion is output at port 3. In the bypass state, directional coupler 200 provides a low impedance path from port 4 to port 3 so that the received RF signal suffers a relatively modest loss in passing the directional coupler to reach the RF receiver. The bypass state can be actuated when RF transceiver 100 is used mainly as an RF receiver and sensitivity to the received RF signal is important.

RF transceiver 100 further includes a controller or microprocessor 164 configured to control the operation of various modules, such as frequency synthesizer 120, RF transmitter 140, RF receiver 150, and directional coupler 200, of RF transceiver 100 by processing a plurality of input signals from the modules and/or producing a plurality of control signals that are used by respective ones of the modules. One of the control signals is for switching the state of directional coupler 200, as discussed in more detail below.

Figure 2A:
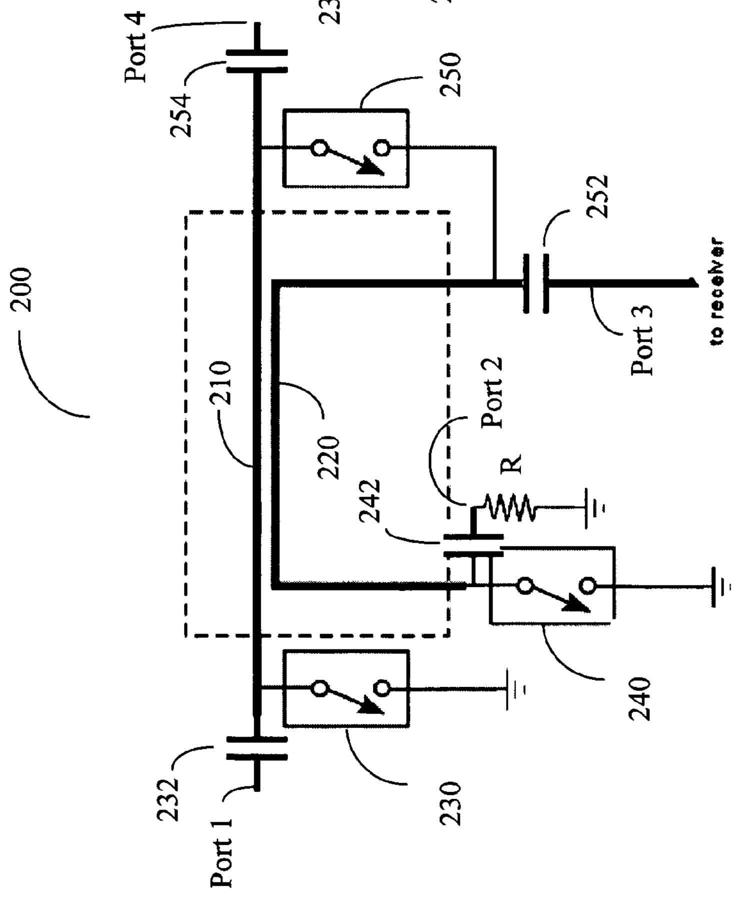
FIGS. 2A and 2B are schematic diagrams of the switchable directional coupler in normal and bypass states, respectively, according to one embodiment of the present invention.
Figure 2B:
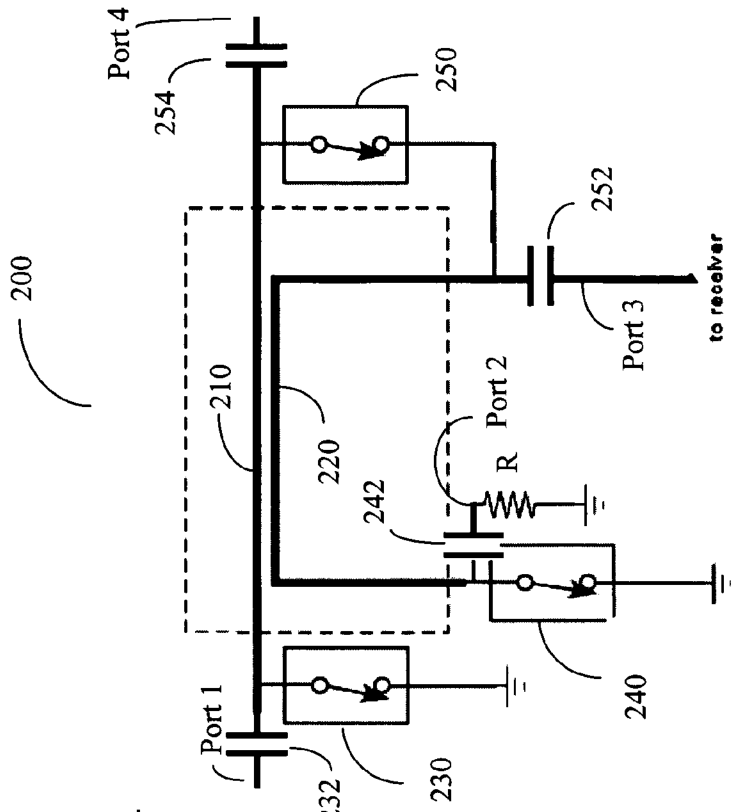

As shown in FIGS. 2A and 2B, directional coupler 200 includes a plurality of conductor lines, including a main line 210 extending between ports 1 and port 4 of directional coupler 200, and a secondary line 220 extending between port 2 and port 3 of directional coupler 200. Main line 210 and secondary line 220 may be part of a conventional quarter-wavelength, coaxial directional coupler. In one embodiment, main line 210 and secondary line 220 each extends over a length of one-quarter wavelength corresponding to a center frequency of a frequency band in which RF transceiver 100 is designed to operate. Termination resistor R is coupled between secondary line 220 and ground.

Still referring to FIGS. 2A and 2B, directional coupler 200 further includes shunt switching elements (switches) 230, 240, and 250, which can be Single Pole, Single Throw (SPST) switches realized using positive intrinsic negative (PIN) diodes, field effect transistor (FET) switches, or other conventional means. Switch 230 is coupled between port 1 and ground, switch 240 is coupled between port 2 and ground, or in parallel with resister R, and switch 250 is coupled between port 3 and port 4. Directional coupler 200 may further include blocking capacitors 232, 242, 252, and 254 at port 1, port 2, port 3, and port 4, respectively.

In the normal state of directional coupler 200, switches 230, 240, and 250 are not actuated, as shown in FIG. 2A, so that each switch is in its "OFF" state and the directional coupler 200 functions as a conventional directional coupler, which separates signals based on the direction of signal propagation. In the normal state, switches 230, 240, and 250 are placed in the signal paths of either the transmit signal or the received RF signal, and thus does not cause any series insertion loss to either the transmit signal or the received signal.

In the bypass state of directional coupler, switches 230, 240, and 250 are actuated, as shown in FIG. 2B, so that each switch is in its "ON" state and the directional coupler 200 becomes in one aspect a quarter-wave transformer and in another aspect a direct path for the received RF signal from antenna 160 to RF receiver 150. As a quarter-wave transformer, directional coupler 200 with the switches actuated transforms a short between port 1 and ground created by switch 230 into an open circuit one-quarter wavelength down the main line 210 at port 4. Directional coupler 200 also transforms another short between port 2 and ground created by switch 240 into an open circuit one-quarter wavelength down the secondary line 220 at port 3. Thus, in the bypass state, the transmit signal does not reach the antenna and directional coupler 200 draws almost no power from the received RF signal. The directional coupler 200 as a quarter-wave transformer also isolates the received RF signal from the short circuits at ports 1 and 2, so that the received RF signal from antenna 160 can be directed to RF receiver 150 via the direct path provided by the actuated switch 250 and suffers only a modest loss (typically <1 dB) in traversing directional coupler 200, which loss is much smaller compared to a typical 10 dB or more loss that would have been encountered using a conventional directional coupler.

Directional coupler 200 is useful in various radio applications, including half-duplex radios in which transmit power or signal must be sensed. One exemplary application of directional coupler 200 is with an RFID reader, which may be required to operate in a LISTEN mode prior to transmitting the transmit signal according to proposed ETSI Standard EN302 208. An example of such an RFID reader is described in commonly assigned U.S. patent application Ser. No. 11/021,302 entitled "Multiprotocol RFID Reader" and filed on Dec. 23, 2004, which is incorporated herein by reference in its entirety. In the LISTEN mode, the RFID reader should not radiate significant RF power and should have good sensitivity to detect other similar devices operating on a channel before interrogation.

Directional coupler 200 allows the construction of an inexpensive, compact RFID reader that provides unimpaired sensitivity in the LISTEN mode. Compared to the radio 10 illustrated in FIG. 1A, which uses a conventional directional coupler 50 and two SPDT switches 60 to facilitate the LISTEN mode operation, the transceiver 100 is advantageous because it does not place a series switch in the signal path of either the transmit signal or the received RF signal during normal operation. The transceiver 100 in FIG. 1B is also advantageous in the LISTEN mode because the received signal sees the insertion loss incurred by a single SPST switch 250 instead of the insertion loss incurred by two SPDT switches 60.

Figure 3:
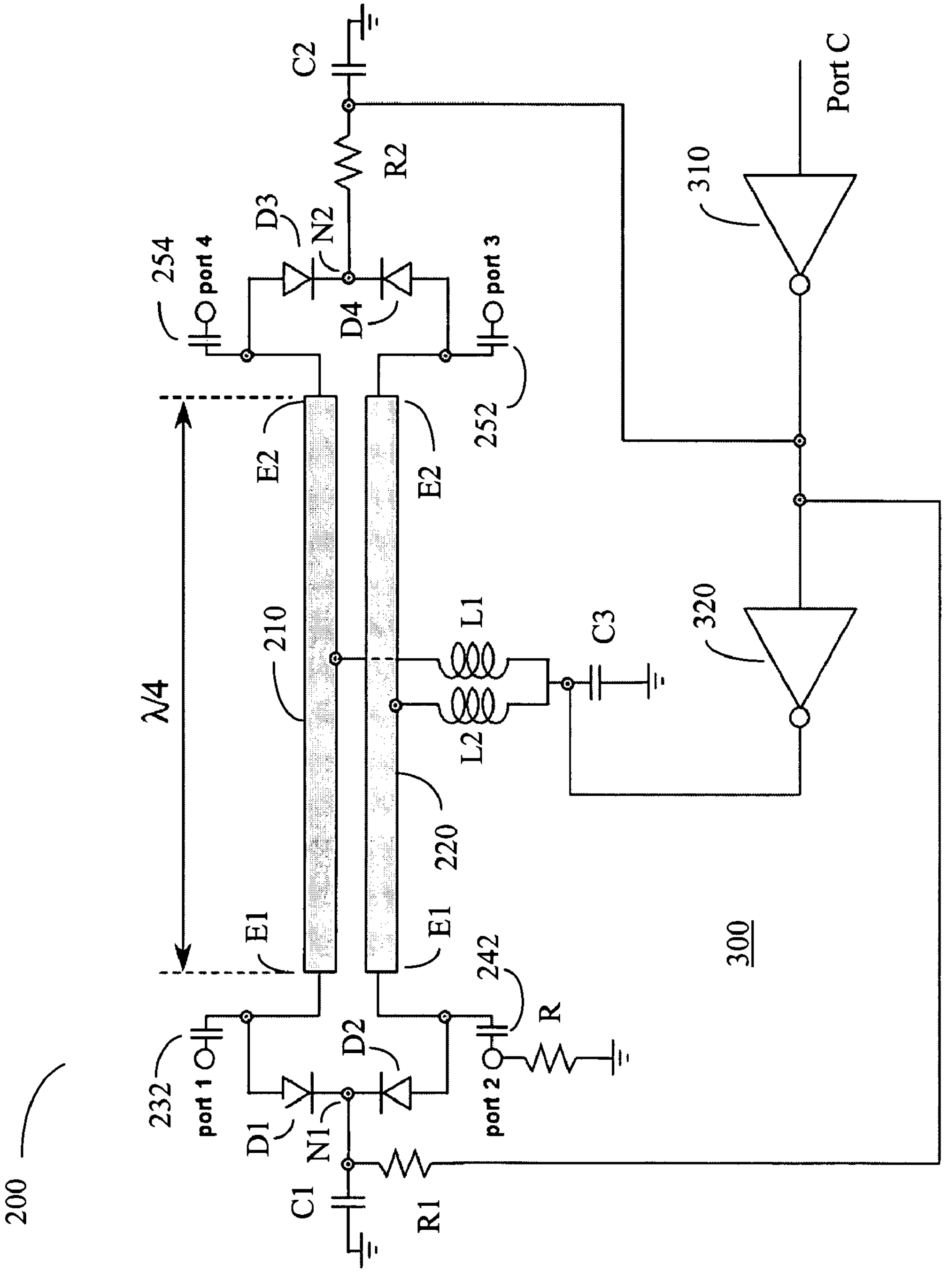
FIG. 3 is a circuit schematic diagram of one exemplary implementation of the switchable directional coupler according to one embodiment of the present invention.

FIG. 3 illustrates an exemplary implementation of directional coupler 200 according to one embodiment of the present invention. As shown in FIG. 3, directional coupler 200 comprises a pair of coupled quarter-wave length transmission lines 210 and 220 each extending between two ends, E1 and E2. Ends E1 of transmission lines 210 and 220 are terminated with a pair PIN diodes D1 and D2, which are RF-grounded through a bypass capacitor C1. Ends E2 of transmission lines 210 and 220 are terminated with a pair PIN diodes D3 and D4. In one embodiment, the pair of diodes D1 and D2 have a common node, which can be either a common cathode or anode, and the pair of diodes D3 and D4 have a common node, which can be either a common cathode or anode.

In one embodiment, each of the PIN diodes D1, D2, D3, and D4 comprises heavily doped "N" and "P" sections separated by an "intrinsic" section (I-region) of a semiconductor material. At microwave or RF frequencies, a PIN diode behaves like a resistor, whose resistance value is determined by the level of DC current through the diode. So, the PIN diode is essentially a DC-controlled high-frequency resistor. For example, a few milliamps of DC current can cause the PIN diode to short out an amp or more of RF current. If no DC current is present, the diode behaves almost like an open circuit, as the thickness of the intrinsic region of the PIN diode substantially reduces its parasitic capacitance.

The frequency at which the PIN diode transitions from acting like a diode to acting like a resistor is a function of the thickness of the I-region. Diodes with thicker I-region can be used as switches for lower frequencies.

To allow control of directional coupler 200 using controller 170, a drive circuit 300 is provided to control the DC currents through PIN diodes D1, D2, D3, and D4. An example of the drive circuit 300 is shown in FIG. 3 to comprise a pair of inverters 310 and 320, a pair of resistors R1 and R2, and a pair of inductors L1 and L2. In one embodiment, diodes D1 and D2 are biased using resistor R1, and diodes D3 and D4 are biased using resistor R2, with a current path closed through inductors L1 and L2 connected to the transmission lines 210 and 220, respectively. Inductors L1 and L2 are provided to isolate parts of the drive circuit 300 from RF signals in the transmission lines. In one embodiment, inductors L1 and L2 are RF grounded through a blocking capacitor C3, and diodes D3 and D4 are each RF coupled to ground through resistor R2 and a bypass capacitor C2. Furthermore, diodes D1 through D4 are each coupled to the control port, port C, of directional coupler through inverter 310. Inverter 320 is provided between resistor R1 or R2 and inductors L1 or L2 for biasing the transmission lines 210 and 220 against a circuit node N1 between diode pair D1 and D2 and a circuit node N2 between diode pair D3 and D4.

Figure 4:
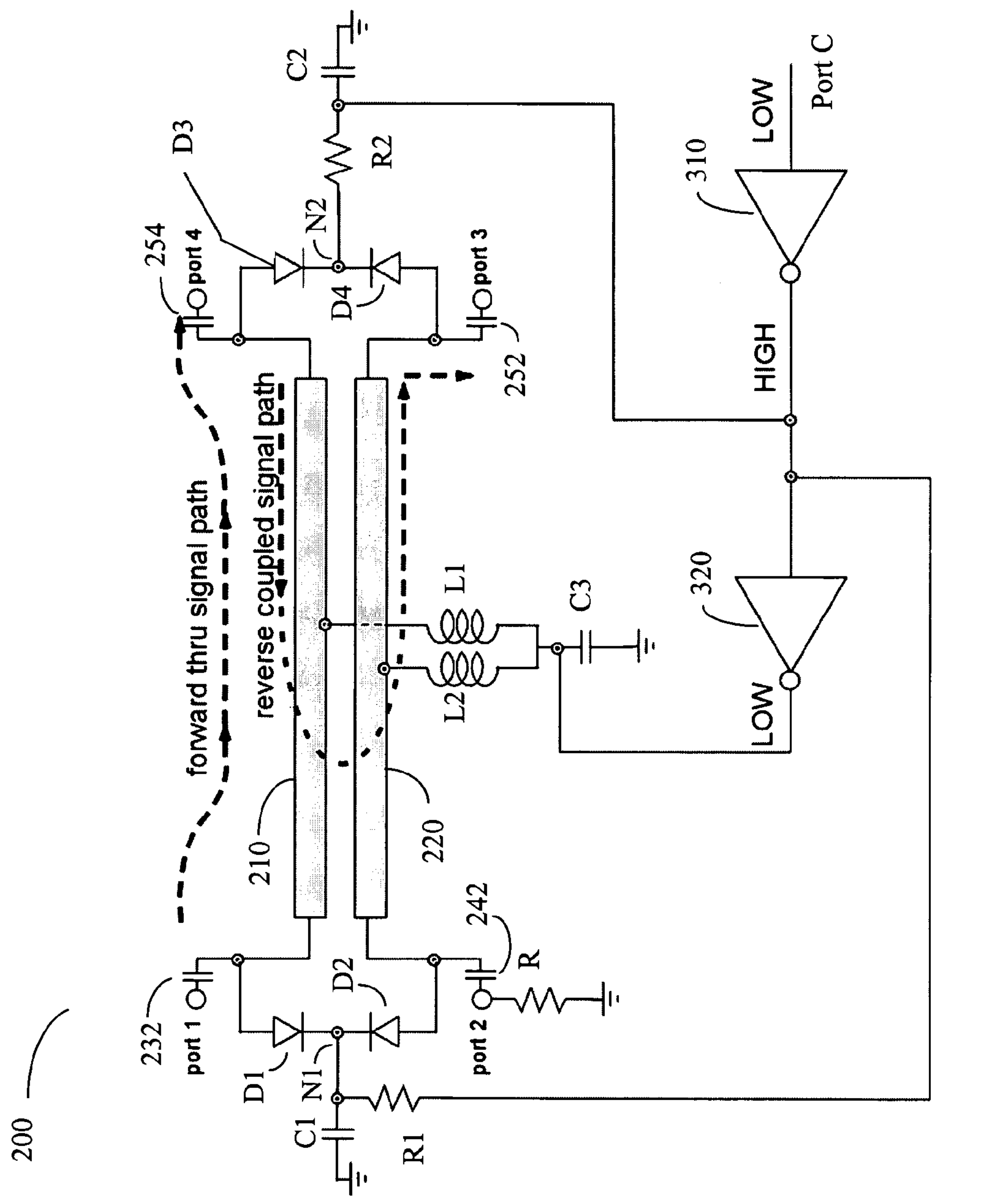
FIG. 4 is a circuit schematic diagram of the normal state of the switchable directional coupler.

Referring to FIG. 4, a logic LOW input at port C of directional coupler results in a logic high at circuit nodes N1 and N2 and a logic low at the transmission lines 210 and 220, causing the diodes to be reverse-biased and directional coupler 200 to be in the normal state. In this case, the transmit signal received at port 1 passes through conductor line 210 in a forward through signal path from port 1 to port 4 with a modest loss due to the relatively small parasitic capacitance associated with each of the diodes, and the received RF signal is coupled from port 4 to port 3.

Figure 5:
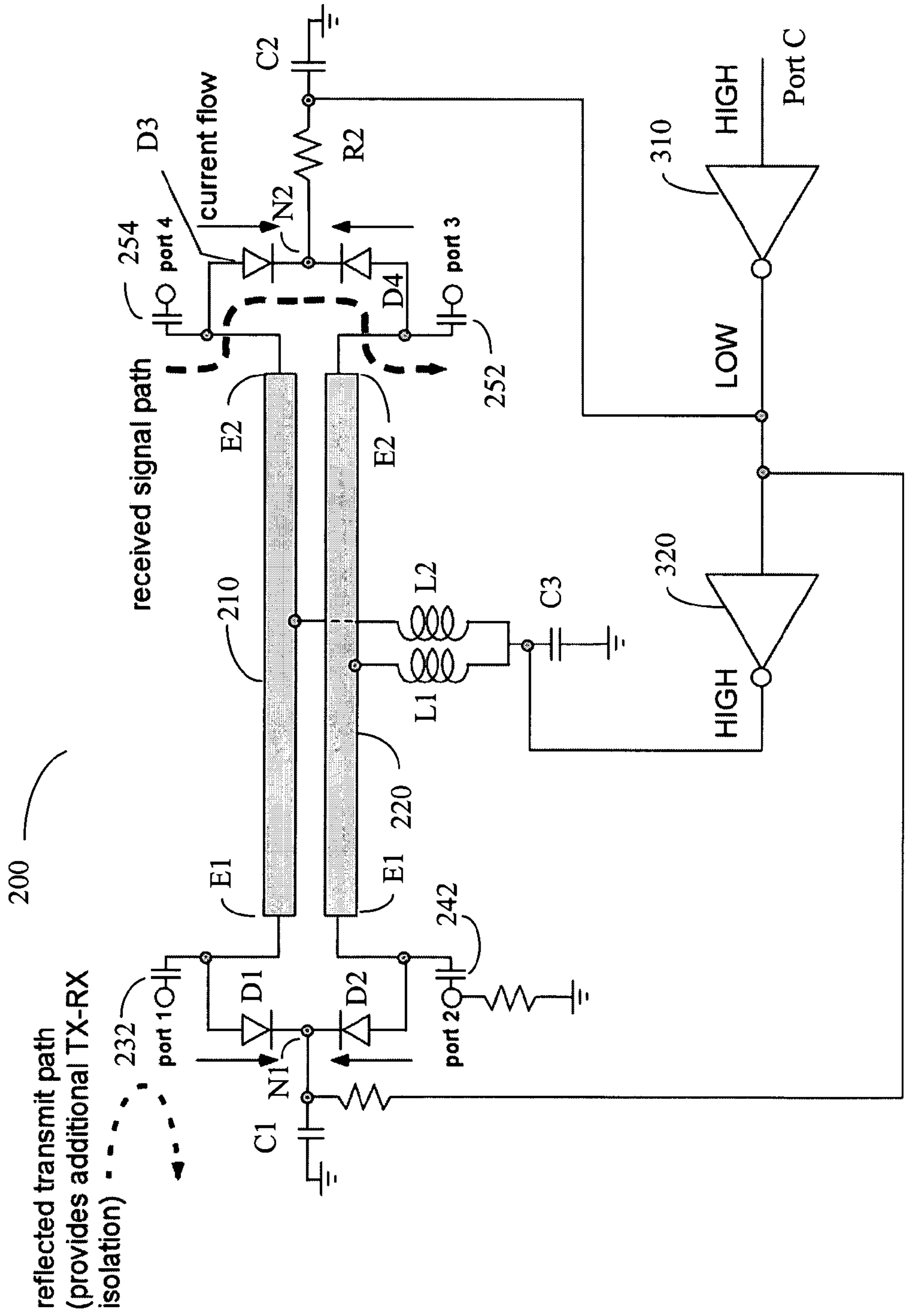
FIG. 5 is a circuit schematic diagram of the bypass state of the switchable directional coupler.

Referring to FIG. 5, when the logic input at port C is switched to HIGH, the diodes are forward-biased and become conducting, and directional coupler 200 is in the bypass state. In this condition, each diode presents very small impedance, and the received RF signal is shorted directly from the antenna coupled to port 4 to the receiver coupled to port 3. The shorted transmission lines present a large impedance to the transmit signal directed to port 1, and provide additional isolation between the transmit signal and the received RF signal. On the other hand, the shorts created by the conducting diodes D1 and D2 at ends E1 of transmission lines 210 and 220 are transformed into open circuits a quarter wavelength down transmission lines 210 and 220 at ends E2, so that transmission lines 210 and 220 draw almost no power from the received RF signal.

Thus, the biasing scheme shown in FIG. 3 allows the usage of a single supply voltage at the control port C to bias the PIN diodes D1 through D4. A conventional approach to biasing the PIN diodes would require blocking capacitors and bias networks for each diode, and a bipolar supply transistor to insure that the diodes are forward biased in the bypass state and remain reverse biased throughout an entire RF cycle in the normal state when a large RF power is present at port 1. The biasing scheme shown in FIG. 3 and discussed above minimizes complexity and parts count by biasing the diodes through the transmission lines 210 and 220. Blocking capacitors are used at the four ports, port 1 through port 4, to allow the DC potential of the transmission lines 210 and 220 to vary without affecting the RF functions of the directional coupler 200. Inverters 310 and 320 allow the full supply voltage to be placed across the diodes in the normal state to reverse bias the diodes, while providing bias current through resistors R1 and R2 in the bypass state when the diodes are forward biased. Since a single bypass capacitor C1 is used to supply bias to both shunt PIN diodes D1 and D2, the biasing scheme works for both common cathode or common anode diode pairs.

In order to present an acceptably small capacitive load in the bypass state, each of the PIN diodes should have relatively small capacitance (e.g., less than about 0.15 pF) when being forward biased. As a non-limiting example, the SMP1345-004 PIN diode commercially available from Alfa Industries, Inc., is an acceptable choice for each of the diodes D1, D2, D3, and D4. Also as a non-limiting example, each of resistors R1 and R2 has a resistance of about 330 ohm, each of capacitors C1, C2, and C3 has a capacitance of about 47 pF, and each of inductors L1 and L2 has an inductance of about 100 nH.

Simulations are performed to calculate the S-parameters associated with directional coupler 200. As an example, the US Industrial, Scientific, and Medical (ISM) frequency band at 902-928 MHz is used as a target band for the directional coupler for the simulation. The switchable directional coupler, however, can be used for RF applications in any frequency band with some adjustments of the component values and as long as the components with the adjusted values are available.

Figure 6:
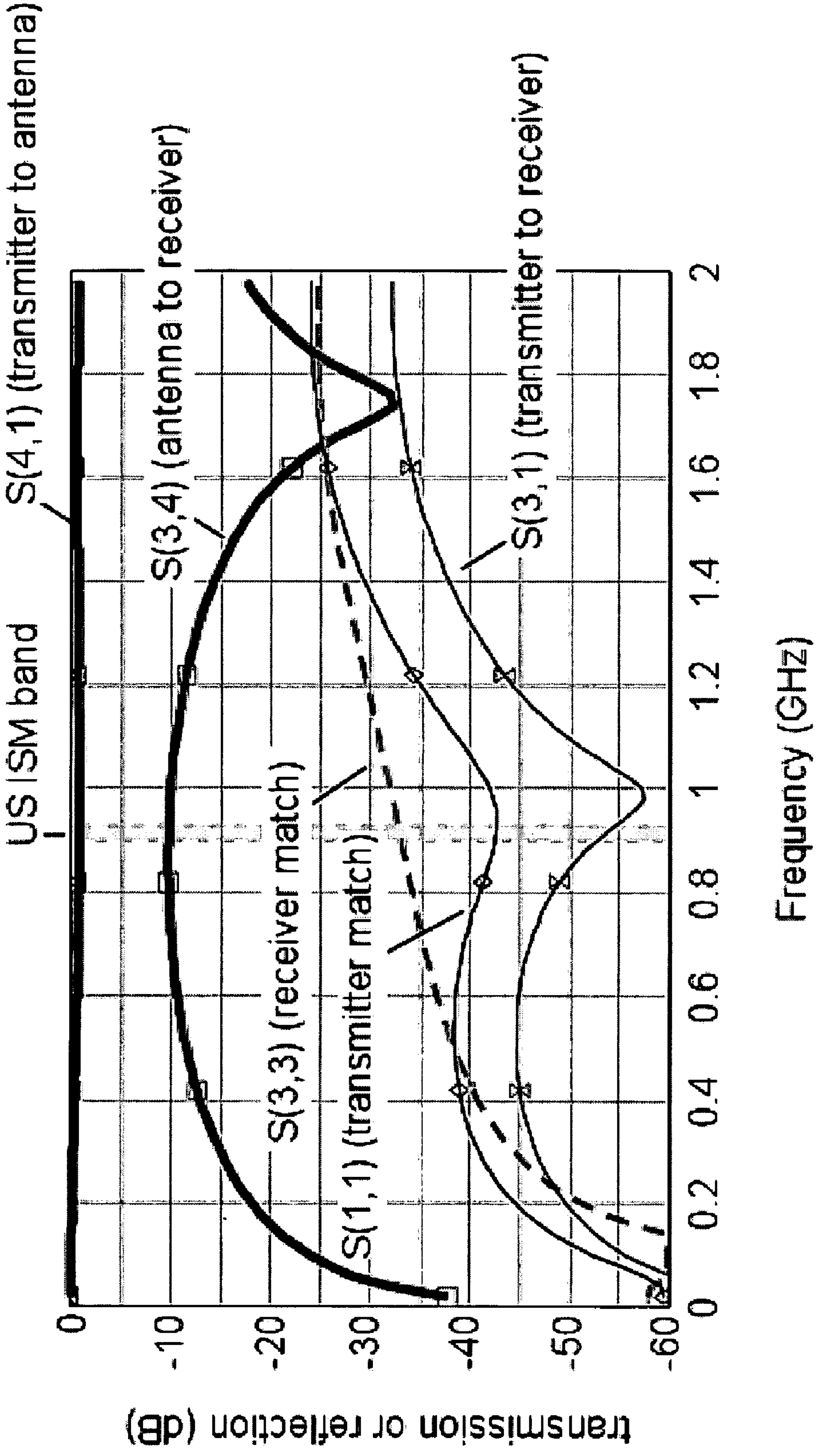
FIG. 6 is a chart illustrating simulation results for 4-port S-parameters of the switchable directional coupler in the normal state.

FIG. 6 shows the simulated S-parameters of directional coupler 200 in the normal state, with S(4,1) representing transmission loss from port 1 to port 4, S(3,4) representing coupling loss from port 4 to port 3, S(3,1) representing a degree of isolation between port 3 and port 1, S(1,1) representing transmitter match, and S(3,3) representing receiver match. As shown in FIG. 6, the transmit signal is passed from the RF transmitter coupled to port 1 to the antenna coupled to port 4 with minimal loss (S(4,1)). The received RF signal from the antenna, which is the wanted signal for the receiver, is passed to the receiver with about 10 dB of coupling loss (S(3,4)) in the US ISM band. Excellent isolation of over 50 dB in the US ISM band is provided between port 1 coupled to the transmitter and port 3 coupled to the receiver (S(3,1)), which is necessary for extracting the usually small received RF signals from the large transmit signal. The match to either the transmitter or the receiver (S(1,1) or S(3,3), respectively) are also excellent, better than −30 dB in the US ISM band.

Figure 7:
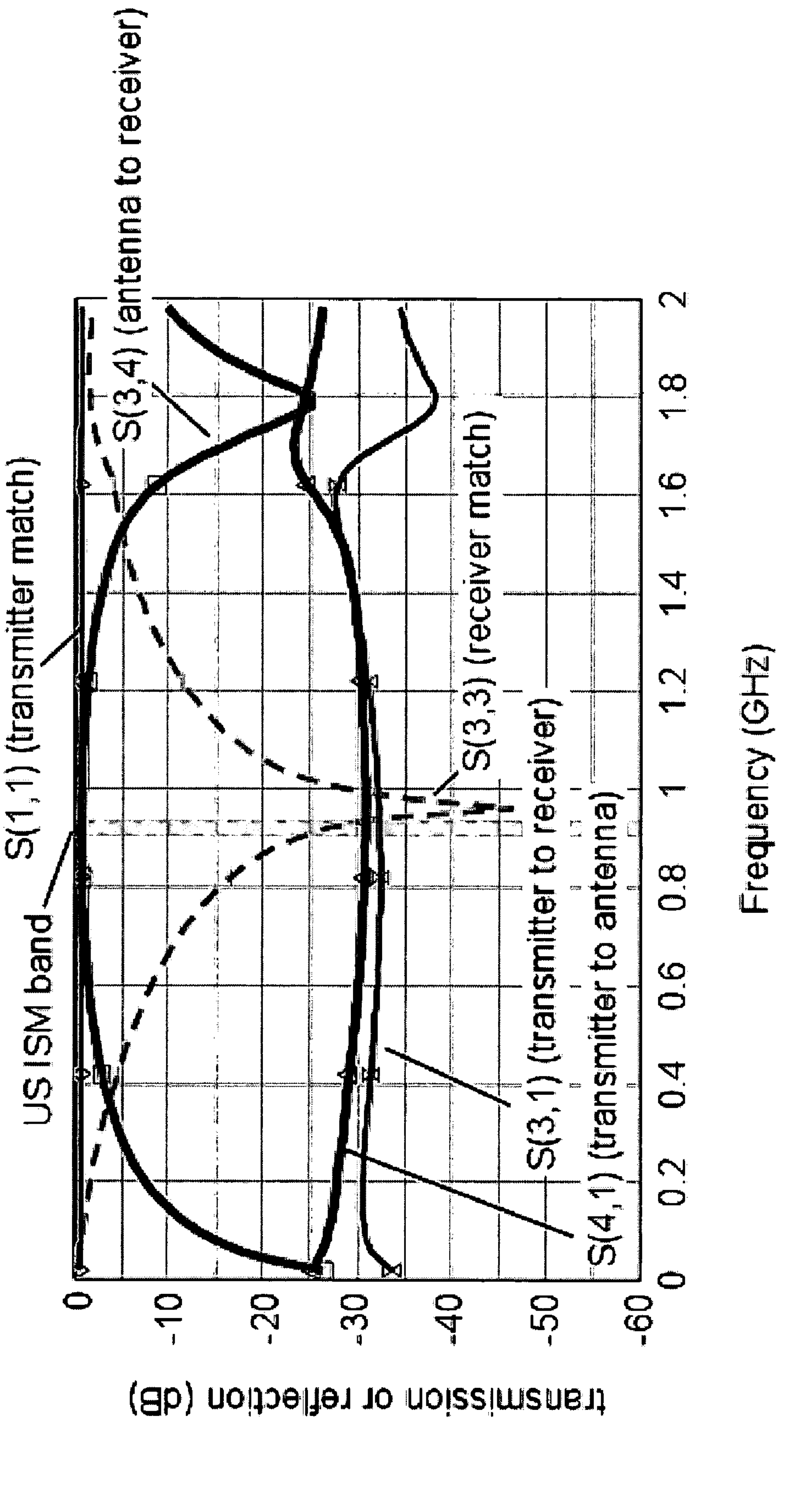
FIG. 7 is a chart illustrating simulation results for 4-port S-parameters of the switchable directional coupler in the bypass state.

FIG. 7 shows the simulated S-parameters of directional coupler 200 in the bypass state. The transmit signal is now mostly reflected, with S(1,1) nearly equal to 1. This high reflection is necessary to achieve good isolation between the transmit signal and the received RF signal, as any received signal that does enter the coupled lines can pass directly from the antenna to the receiver by way of the low-impedance diodes D3 and D4. The signal from the antenna (the wanted signal for the receiver), is passed directly to the receiver with negligible loss (S(3,4)). The match to the receiver port (S(3, 3)), being now provided by the quarter-wave transformer formed by the coupled conductor lines 210 and 220, is somewhat more narrow-banded than in the normal state, but still an excellent −25 dB in the target band. The transmitter is well-isolated from both the antenna and the receiver, with better than −30 dB loss in the target band ((S(4,1) and S(3,1)). This isolation may normally be combined with a powered-down state in the transmitter to ensure negligible degradation of the receiver sensitivity.

This invention has been described in terms of a number of embodiments, but this description is not meant to limit the scope of the invention. Numerous variations will be apparent to those skilled in the art, without departing from the spirit and scope of the invention disclosed herein. For example, FETs can be used to replace some or all of PIN diodes D1 through D4, as shown in FIG. 3, with, for example, the source terminal of each FET connected to circuit node N1 or N2 and the drain terminal connected to port 1, port 2, port 3, or port 4. PIN diodes are usually preferred over FETs because PIN diodes have a significant bandwidth advantage over FETs. An upper frequency response limit for PIN diodes can be much higher due to their lower off-state capacitance for a given on-resistance. But FETs can be good alternatives to PIN diodes in many situations. Furthermore, the drive circuit 300 in FIG. 3 can be configured differently using conventional means, and the level of logic inputs to control terminal C of the directional coupler to put the directional coupler in either the normal state or the bias state depends on how the drive circuit is configured and how the PIN diodes are connected. Moreover, while the switchable directional coupler has been described as part of an RF transceiver, it may be used outside of an RF transceiver in other applications.

I claim:

1. A radio frequency (RF) transceiver, comprising:

an RF transmitter;

an RF receiver; and a directional coupler switchable between a normal state and a bypass state and coupled between an antenna and the RF transmitter and between the antenna and the RF receiver, the directional coupler in the normal state allowing passage of a large portion of a transmit signal from the RF transmitter to the antenna and coupling a portion of a received RF signal from the antenna to the RF receiver, the directional coupler in the bypass state directing the received RF signal from the antenna to the RF receiver with a single switch, wherein the directional coupler comprises first and second transmission lines each extending between first and second ends, a first shunt switch coupled to the first end of the first transmission line, a second shunt switch coupled to the first end of the second transmission line, and a third shunt switch coupled between the second end of the first transmission line and the second end of the second transmission line.

2. The RF transceiver of claim 1, wherein the directional coupler in the bypass state provides a short circuit at an input port coupled to the RF transmitter and functions as a quarter-wave transformer that isolates the received RF signal from the short circuit.

3. The RF transceiver of claim 1, wherein each shunt switch comprises at least one PIN diode.

4. The RF transceiver of claim 3, wherein the PIN diodes associated with the first and second switches have a common node that is DC biased with a resistor and RF bypassed to ground with a capacitor.

5. The RF transceiver of claim 1, wherein each shunt switch comprises at least one field effect transistor.

6. The RF transceiver of claim 1, further comprising a drive circuit to allow control of the shunt switches using a control signal, the drive circuit comprising a pair of inverters and providing a return current path through a common node of a pair of PIN diodes.

7. A radio frequency (RF) transceiver, comprising:

an RF transmitter;

an RF receiver; and a directional coupler switchable between a normal state and a bypass state and coupled between an antenna and the RF transmitter and between the antenna and the RF receiver, the directional coupler in the normal state allowing passage of a large portion of a transmit signal from the RF transmitter to the antenna through a first transmission path and coupling a portion of a received RF signal from the antenna to the RF receiver through a second transmission path, the directional coupler in the bypass state directing the received RF signal from the antenna to the RF receiver with a single switch through a third transmission path and wherein the directional coupler functions as a quarter-wave transformer that isolates the received RF signal from an input port coupled to the RF transmitter, and wherein the first and second transmission paths of the directional coupler comprise:

first and second transmission lines each extending between first and second ends;

a first shunt switch coupled to the first end of the first transmission line;

a second shunt switch coupled to the first end of the second transmission line; and a third shunt switch coupled between the second end of the first transmission line and the second end of the second transmission line.

8. The RF transceiver of claim 7, wherein the directional coupler in the bypass state provides a short circuit at the input port coupled to the RF transmitter and functions as a quarter-wave transformer that isolates the received RF signal from the short circuit.

9. The RF transceiver of claim 7, wherein each shunt switch comprises at least one PIN diode.

10. The RF transceiver of claim 9, wherein the PIN diodes associated with the first and second switches have a common node that is DC biased with a resistor and RF bypassed to ground with a capacitor.

11. The RF transceiver of claim 7, wherein each shunt switch comprises at least one field effect transistor.

12. The RF transceiver of claim 7, further comprising a drive circuit to allow control of the shunt switches using a control signal, the drive circuit comprising a pair of inverters and providing a return current path through a common node of a pair of PIN diodes.

* * * * *